Sept. 24, 1957     H. J. KENT     2,807,425
COIL WINDING APPARATUS
Filed Dec. 3, 1952     3 Sheets-Sheet 1
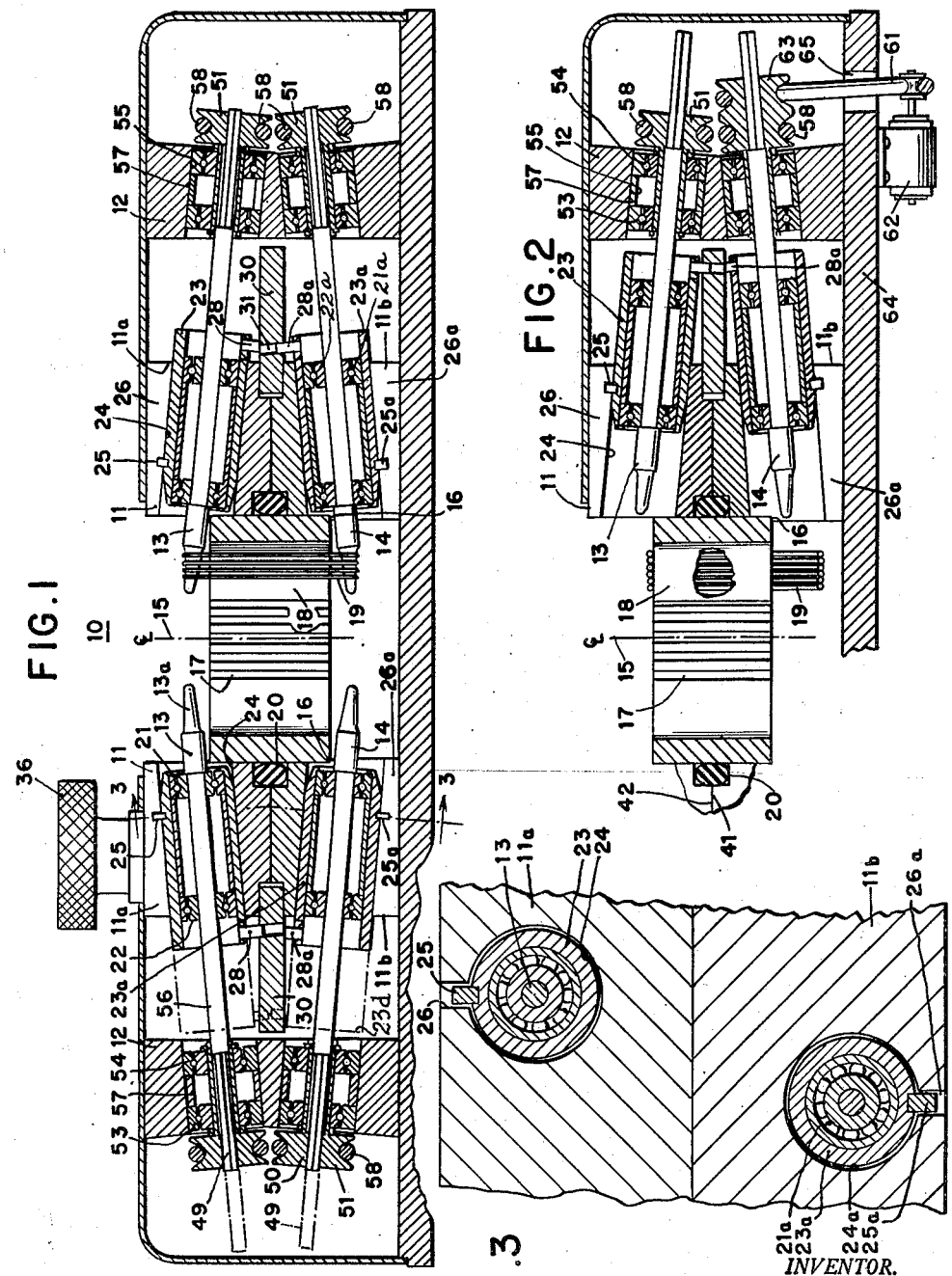
INVENTOR.
Henry J. Kent Sept. 24, 1957  H. J. KENT  2,807,425
COIL WINDING APPARATUS
Filed Dec. 3, 1952  3 Sheets-Sheet 2
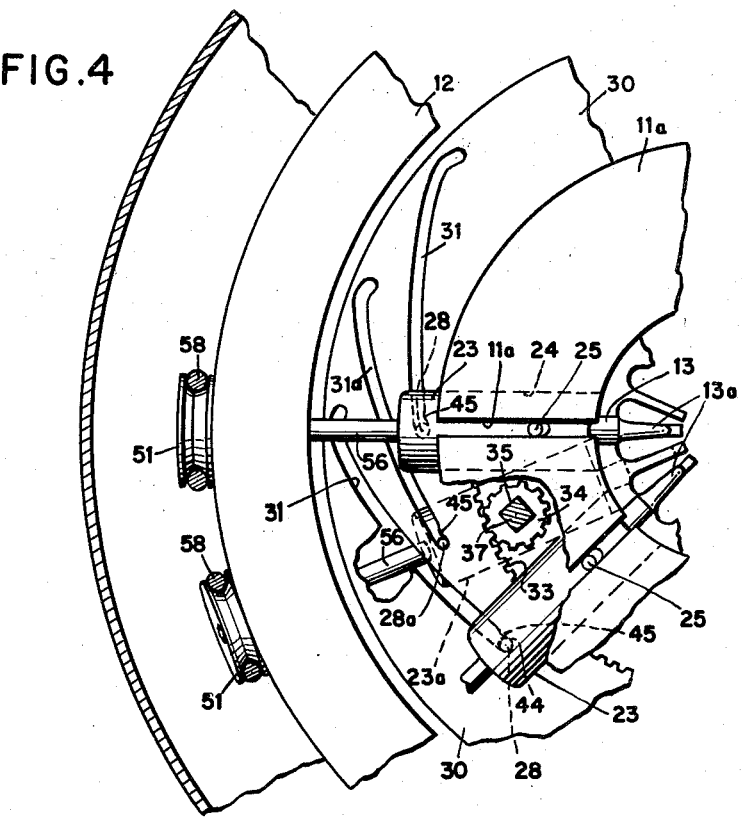
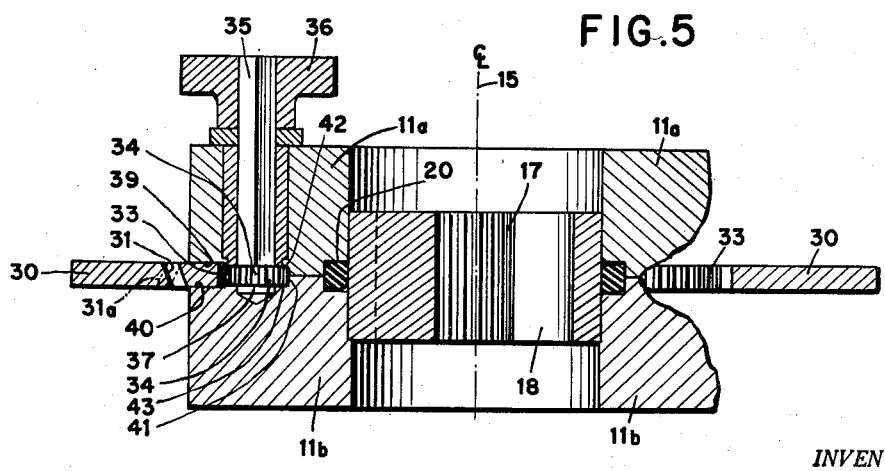
INVENTOR.
Henry J. Kent
BY
*Julius E. Foster*
ATTORNEY Sept. 24, 1957  H. J. KENT  2,807,425
COIL WINDING APPARATUS
Filed Dec. 3, 1952  3 Sheets-Sheet 3
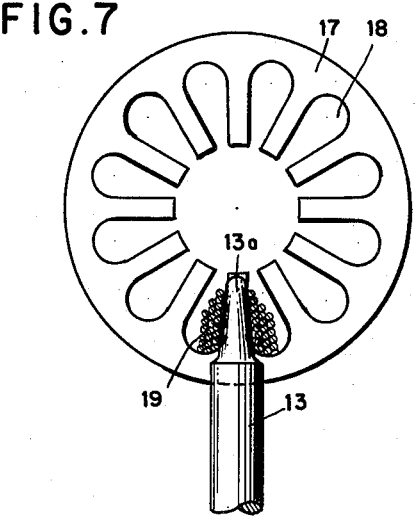
FIG.7
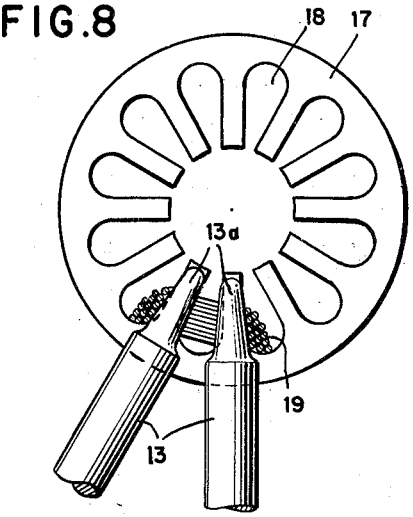
FIG.8
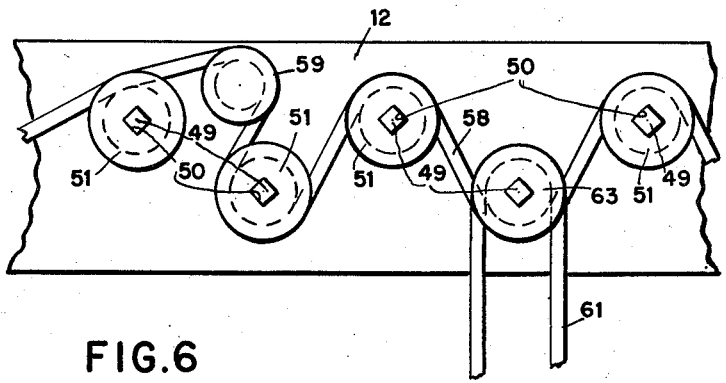
FIG.10
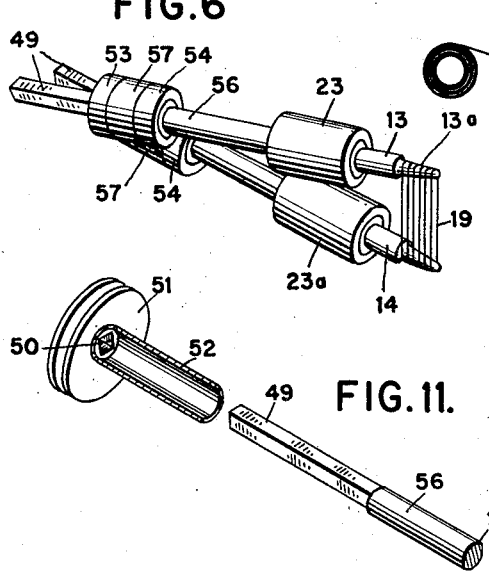
FIG.6
FIG.11.
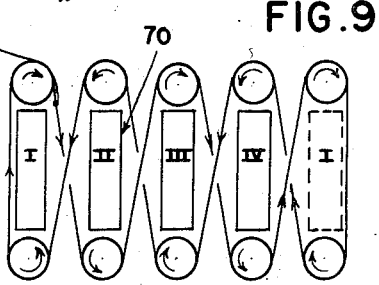
FIG.9
INVENTOR.
Henry J. Kent
BY
ATTORNEY United States Patent Office 2,807,425
Patented Sept. 24, 1957

2,807,425

COIL WINDING APPARATUS

Henry J. Kent, West Englewood, N. J., assignor to Kearfott Company, Inc., Little Falls, N. J., a corporation of New York Application December 3, 1952, Serial No. 323,848

15 Claims. (Cl. 242—1.1)

This invention relates to winding machines, and particularly to machines for winding coils or distributed windings on small slotted core structures. Such cores may be used, for example, as the stators of small dynamo-electric devices, such as electro-mechanical position indicators, synchros, and the like.

In remote indicating systems, and in remote control systems where an operation is to be performed at a distance, the position-indicating devices and the position-control devices may be essentially small dynamo-electric motors, generators, or transformers, provided with a rotor and a stator, to control the phase or magnitude of a transmitted signal as a function of the relative position of the rotor and the stator.

Various remotely controlled operating mechanisms are finding increased utilization in aircraft, for example, due to the increase in the size of the aircraft and of its components, and the consequent need for power operation of those various components of the craft. Such power operation must be attended by suitable indicators that will show that the operation has been completely and fully performed. In addition to indicating that such operations have been performed, it is frequently necessary to control the motive power equipment up to the point of completion of an operation. For both the indicating and the control functions, the small dynamo-electric structures that are employed, are of the type that constitute the dynamo-electric devices referred to above, which embody a rotor and a stator for modifying a signal as a function of the relative position of the rotor and the stator.

The stator structure, in conventional form, consists of a stack of magnetizable stampings of annular rings having inwardly extending radial teeth separated by spaces or slots that are to receive and accommodate the windings for magnetizing that stator core structure.

Where such devices are to be used on aircraft, that use in itself dictates keeping the weight of the unit as small as possible. Moreover, since the function of position-indicating or position-control, for which the unit may be used, requires very little or no electro-magnetic torque, there is this further reason for keeping the size of the unit as small as possible, within the limits of adequacy, solely as a matter of economy.

Thus the tendency has been to reduce the size of these small synchros or indicating units, or servo-control units, to as small a volumetric dimension as possible. With the decrease in size of the core structure, the slot dimensions have been correspondingly decreased. The sizes in thickness or diameter of the wires to be used for the windings must then be as small as possible. However, the difficulty of winding the slotted cores of this type and size increases with reduction in size of the core and slots.

In one method of normal conventional practice, a coil is wound separately from the slotted core, and the coil is then manually manipulated into position in the slots in the core structure where the coil is ultimately to be located for its function. To permit of ease in such manipulation, the coils must be made slightly larger than is necessary merely for the magnetizing function required of the coil. Each such larger coil therefore utilizes more copper than is electrically necessary. Moreover, even after the coil is located in position in the core slots, such longer coil has end loops that extend out beyond the ends of the slots in which the operative magnetizing coil sides are disposed, and those end loops impose a further problem of tying those end loops down.

Thus, the additional material presently required for the end loops for the manual manipulation of inserting the pre-wound coils in the small slots causes more copper wire to be used in forming the coil than is necessary for the functioning of the coil. This adds unnecessarily to the size and weight of the finished unit. Aside from the extra cost of the extra copper that is used, and in a sense wasted by the manual method of pre-winding and positioning the coils in the core structure, the unnecessary weight added to each of the devices becomes an important factor, especially where those devices, and particularly a large number of them, are to be used in aircraft.

The object of the present invention is to provide a simple winding machine that will wind a coil or a distributed winding directly on a slotted core, for example, a stator, and directly into the slots which the coil or distributed winding is to occupy in the finished stator unit. In that manner the coil or distributed winding may be wound to a minimum size controlled by the dimensions of the elements of the winding machine, with the consequence that the finished stator will be a more compact structure and will be of lighter weight with a minimum amount of copper.

Another object of this invention is to provide a winding machine that is relatively small and simple, and that can be operated on a bench directly in front of an operator, and that is so constructed as to permit the easy and ready insertion of an empty core structure for the winding operation, and to permit easy removal of the core after the completion of the winding operation.

Another object of this invention is to provide a simple winding machine for a slotted core structure, with provisions on the machine for easily arranging the machine to locate the winding or coil sides in any desired sequence in the slots.

Another object of the invention is to provide a winding machine of this type, in which a winding distribution and sequence may be pre-determined for a particular type of stator or core, for a manufacturing run of a larger number of the core units, so the machine may be then controlled to operate substantially semi-automatically in winding a coil on the core, or in winding an entire distributed winding of several coils on the core, after a simple pre-setting operation by the operator of the machine.

Another object of the invention is to provide a winding machine for winding a coil or a distributed winding of fine wire directly in place in a slotted core structure, in such manner as to save the winding from any frictional rubbing action during its distribution in the slots, in order thereby to protect the wire insulation from injury.

Briefly, one form of machine, as herein illustrated, is constructed with a support, to receive a slotted core that is to be wound, and is provided with several working pairs of winding spindles movable to operating positions to straddle the core so the spindle tips of each pair of spindles will be adjacent the top and the bottom slot openings to support and guide a wire for the winding through the slot. After the winding operation, the spindles are retracted from their operating positions to clear the path of removal of the wound core, and to permit the core to be removed and to permit a subsequent empty core to be inserted for the subsequent winding operation on the machine.

The spindles are supported on anti-friction bearings so they are free to rotate with substantially no friction. The two spindle winding ends of a working pair support and guide the small wire conductor that is to be wound in position in the associated slot to form a coil side of the coil or the distributed winding. As the spindles are rotated, they circulate or reeve the wire through the slot in a direction that is pre-determined by suitable arrangements of the driving means for the other or driving ends of the spindles.

The driving end of each spindle is provided with a pulley, for example a V-shaped pulley, so a single driving belt may be seated in the several pulleys in selected sequence to achieve the driving direction of rotation desired for the respective spindles controlled by the pulleys.

In order to permit a core structure to be inserted for the winding operation, and then to be removed after the winding operation is completed, the spindles are supported to be retractable from their respective winding positions, above and below the core structure. For winding operation, the spindles are advanced and restored to their operating positions at the core slots.

Thus, an operator of the machine merely needs to retract the spindles to provide a free space for the insertion of the core structure that is to be wound, and then after the core structure is inserted in position, the spindles are advanced to their positions above and below the slots of the core where they are then ready to perform the winding operation.

In order to start and guide the wire through the slots in the proper direction of the winding desired in the slot, a leader of suitable flexible material is disposed in the slots and supported on the appropriate spindles according to the wiring diagram which defines the coil distribution or winding distribution that is to be established on the core structure. Such leader may be the wire itself that is to be wound on the core, or it may be a fine nylon thread, or the like. After the leader is thus disposed on the spindles to define the winding path, the ends of the leader are secured to form a closed loop. One end of the winding wire from a supply reel is then attached to the leader, to be drawn through the slots by the leader, which will be circulated through the slots in the path outlined by the original disposition of the leader.

The driving belt on the pulleys at the driven ends of the spindles, is also properly wound on those pulleys to drive those pulleys to establish the desired rotation of the spindles in the proper directions to circulate the leader and to deliver and distribute the wire into the slots as desired. When the belt is thus once positioned on the spindles, it may be left there for an entire run of the cores to be thus wound.

A leader is placed in each core and disposed on the spindles prior to the winding operation of each core. Once the leader has been disposed on the spindles, one terminal of the wire from a supply reel is attached to the leader and the machine is then ready to operate. Upon starting the machine the spindles are driven in the proper direction and the wire from the supply reel is carried through the appropriate winding path determined by the disposition of the leader. The winding operation is then continued until the leader has moved the wire through the entire winding path to establish the coil with the desired number of turns or to form the distributed winding with the desired number of coils or coil sides.

The construction of the machine and the method of winding are explained in more detail in the following description of the accompanying drawings, in which Figure 1 is a side view, partially in section and partially in elevation, taken through a winding machine of this invention, with a core in position and with the winding spindles in their advanced or operating positions, and one coil in position on the spindles;

Figure 2 is a similar view of the right-hand side of the machine of Fig. 1, showing the core still in place, but with the spindles and their supporting bearings retracted to clearing position, out of the path of insertion and removal of the core, and showing the disposition of a coil that was on a pair of spindles;

Figure 3 is a vertical section along the line 3—3 of Fig. 1, to show the vertically off-set arrangement of a pair of spindles and their bearing supports, with the guide fingers for the bearing quills indicated;

Figure 4 is a plan view of the cam ring and its operating pinion for shifting the spindles radially to their operating or to their retracted positions;

Figure 5 is a schematic side view of the cam ring and the operating pinion of Fig. 4;

Figure 6 is a schematic perspective view showing the general relative disposition of the two spindles of a pair;

Figure 7 is a schematic plan view of a single spindle above a core in which a typical coil is wound into two adjacent slots by the single spindle, its lower mate not being shown;

Figure 8 is a similar view for an arrangement in which two spindles are used, above and below the core, where the coil is to be disposed in slots not immediately adjacent, but spaced by one or more other slots that may be utilized to accommodate other coils;

Figure 9 is a schematic view of a winding diagram showing a typical winding path and the disposition of the coils of the winding in several adjacent slots;

Figure 10 is a schematic view of a development showing the driving pulleys for the spindles, and the dispositions of the driving belt on the pulleys to achieve rotation of the spindles in proper desired directions Figure 11 is an enlarged sectional view of the rear bearing support structure for a spindle.

As shown in Fig. 1 of the drawings, a winding machine 10, embodying the principles of this invention, comprises a central positioning ring 11 and a concentric radially spaced outer positioning ring 12, both of which co-operate to support angularly spaced pairs of radially-disposed spindles 13 and 14. The two rings 11 and 12 are disposed horizontally and concentrically around a main central vertical axis 15 of the machine.

The central ring 11 consists of a top ring portion 11–a and a bottom portion 11–b, and performs several functions. As shown in Figures 1 and 2, the central ring 11 is provided with a narrow shoulder 16 on the inner peripheral surface of the bottom portion 11–b to receive and support a stator core structure 17 upon which a coil or winding is to be wound. The core structure 17 is partially broken away to expose the slots 18 in which the coils or windings are to be disposed. The strands of one coil 19 are shown on one pair of the spindles. When the core structure 17 is in such operating position, ready to be wound, it is substantially concentric with the central ring 11 relative to the main axis 15 of the machine. An annular ring 20 of frictional material, such as rubber, serves as a retaining ring for the core 17.

In order that an empty stator core may be readily inserted in place for winding, and then readily removed from the machine after the coil is wound thereon, the upper spindles 13 must be retracted or moved back out of the path of insertion and removal of the core member 17. To release the coils, for removal of the core, the lower spindles 14 also must be retracted.

The spindles may be moved out of such insertion and removal path in various ways, but a preferred method of moving the spindles out of the way of the core structure is illustrated herein as being a translatory retraction of the spindles, backward along their own axes.

The spindles 13 and 14 are provided with bearing supports at their front ends and at their back ends, to provide stability to the spindles during operation, at which time they will normally be rotated at relatively high speeds. All of the spindles are supported in bearings in the manner shown for the spindles 13 in Fig. 1. Adjacent the front end of each spindle, two anti-friction bearings 21 and 22 are provided to support the front end of the spindle 13. Those bearings 21 and 22 are in turn fixedly secured and supported in a quill or cylindrical bearing shell 23 that constitutes a substantially rigid cylinder. The quill or shell 23 thus supports the spindle 13 concentrically. The quill is in turn supported in an inclined cylindrical passage 24 in the top portion 11–a of the center ring 11 in such manner as to point the spindle 13 inwardly and upwardly toward the winding operating position near the central axis of the machine. That top portion or ring 11–a serves as a guide ring for the quills 23.

The bearing shell 23 is axially movable along its own axis, on the inclined surface 24, and when the shell is so moved it serves to shift the bearings 21 and 22 and the spindles 13 which they support. The bearing shell 23 is movable to a forward terminal or limit position and to a rearward limit position. At the forward position, the front or spinning end of the spindle will overhang a coil slot 18 in the core structure. In the retracted position, the shell 23 is moved back to its back limit position, indicated in dot-and-dash line marked 23–d in upper left hand part of Fig. 1. In that retracted position of the bearing shell 23, the spindle tip 13–a, at the front end of the spindle 13, is radially retracted behind the inner peripheral surface plane of the central ring 11, out of the path of movement of the core structure 17, to permit free insertion or removal of the core 17, as appears more fully in Figure 2.

Movement of the bearing quill 23 is limited to reciprocating translatory motion without rotation. Rotation is prevented by an upper lug 25, near the front end of the bearing quill or shell 23. The lug 25 extends into a retaining guide slot 26 in the top portion or guide ring 11–a of a center ring 11, along the top length of the inclined cylindrical passage 24.

The upper bearing quill 23 is otherwise guided and confined in its movement within that inclined passage 24 in the upper ring portion or guide ring 11–a. The passage 24 is of sufficient diameter to permit free movement of the bearing cylinder or quill 23, to either its forward or rear terminal positions.

The lower spindle 14 is similarly supported in bearings 21–a and 22–a in a quill 23–a, similar to the arrangement for supporting upper spindle 13. The lower quill 23–a is likewise supported and guided in its movement in an inclined passage 24–a, and prevented from rotating by a lug or guide finger 25–a extending into and confined by a slot 26–a in the lower portion of the center ring 11.

Each upper quill 23 is provided with a rear lug or finger 28 by which the quill may be moved from operating position to retracted position, and vice versa. Each lower quill 23–a is similarly provided with a rear lug 28–a for the same purpose.

In order to operate all the quills 23 and 23–a simultaneously, to move the spindles to their operating positions or to their retracted positions, a cam ring 30, as in Figs. 4 and 5, is provided that has a cam slot 31 for each moving lug or finger 28 or 28–a at the rear of each of the several quills 23 and 23–a. The cam ring 30 has a flat annular ring body with gear teeth 33 on its inner peripheral edge, for operation of the ring by a pinion gear 34. The pinion gear 34 is arranged to be operated by a shaft 35, having a hand-wheel 36 at the top of the shaft and a squared shank 37, at the lower end of the shaft 35, to permit ready slip fit mechanical driving connection and disconnection of the shaft 35 and the pinion gear 34, as in Figs. 4 and 5. The single pinion 34 and the single operating wheel 36 are sufficient to move all the spindles to desired positions.

The cam ring 30 nests between the upper and the lower portions 11–a and 11–b, and is supported between two annular shoulders 39 and 40 on the respective portions 11–a and 11–b of the center ring 11. Similarly, the pinion gear 34 nests in a circular pocket 41 formed by two superposed circular recesses 42 and 43 in the respective portions 11–a and 11–b of the center ring 11.

In assembling the cam ring 30 in position, it is placed on the lower portion 11–b of the center ring 11, in mesh with the pinion 34. The operating shaft 35 for the pinion is then positioned on the top portion 11–a of center ring 11, and the square shank 37 is fitted into the square hub of the pinion 34 to properly position the upper portion of the center ring 11.

When the spindles are to be retracted to non-operating position, the hand-wheel 36, that operates the pinion 34 and the cam ring 30, is turned angularly counter-clockwise through a small predetermined angle. It shifts the cam ring 30 through the same angle counter-clockwise, as may be seen in Fig. 4, to cause the cam slots 31 and slots 31–a of Fig. 5, to pull the lugs 28 and 28–a, of the respective quills 23 and 23–a, backward to their retracted positions. As the quills 23 and 23–a move backward, they carry all the spindles 13 and 14 with them. As shown in Figs. 1 and 11, the back ends of the spindles are supported in bearings with a construction to permit relative axial movement between each spindle and its back end bearing.

When the spindles are to be moved forward to their advanced or operating positions, the hand-wheel 36 is operated clock-wise, to move the cam ring 30 also clockwise. The quill lugs 31 and 31–a are then moved radially inward until they reach their respective limit positions at the inner ends 44 of the cam slots 31. To keep the quills from creeping during operation of the winding machine, any suitable arrangement may be provided to lock the quills in their advanced positions. One arrangement is to provide each of the cam slots 31 with a small hump 45 just short of the inner end of the slot, so when the cam ring 30 is moved clockwise through its predetermined angle to position the spindles at advanced or operating positions, the respective positioning lugs or fingers 28 and 28–a will be moved over their associated humps 45 and held at their terminal positions at the inner ends of the cam slots 31 and 31–a, in the short pocket spaces between each such hump 45 and the adjacent end of the cam slot 31.

In moving the spindles to their operating positions or to their retracted positions, a lost-motion connection is utilized at the back ends of the spindles, as shown in Figs. 1 and 11.

The back end of each spindle shank is formed as a square prism 49 which extends loosely through a square hole 50 in the hub of its driving pulley 51 with a loose fit to permit free relative axial movement between the square spindle prism shank 49 and the driving pulley 51. The front face of the pulley 51 has a co-axial integral extension sleeve 52 that serves as a hollow rotatable shaft to support the driving pulley 51 in fixed axial position between two anti-friction bearings 53 and 54. Those two bearings 53 and 54 are supported in fixed position in suitable circular recesses 55 in the outer ring 12 originally referred to, and separated by a spacing ring 57.

The hollow extension sleeve shaft 52 on the driving pulley 51 also serves as a partial support for the circular body section 56 of the shank of the spindle 13, adjacent the end of the square shank portion 49, when the spindle 13 is moved axially to and from its operative front position. At the same time, the loose fit between the square shank section 49 of the spindle and the slightly larger square hub opening 50 in the pulley 51 permits free translatory motion of the spindle for its axial shifting to and from its operative position.

The spindles 13 and 14 are all simultaneously rotated and driven by a flexible driving belt 58 which is fitted on and around the several driving pulleys 51. The direction of the disposition of that driving belt 58 on the pulleys determines the directions of rotation of the spindles, to establish the proper forward movement of the wire, to form the desired coil or distributed winding in the various slots of the core.

A typical disposition of part of the driving belt 58 on a few of the pulleys 51 is shown in the development in Fig. 10. By disposing the curl of the belt around the various pulleys in appropriate directions, the direction of rotation of the spindles is controlled. To tighten the belt, an idler 59 may be provided, with suitable adjusting means to move the idler. The idler 59 may be suitably mounted on the ring 12, which supports the back bearings for the spindles. Similar idlers may be provided to permit a simple shift in disposition of the belt to drive any selected pulley in a reverse direction.

Driving energy may be supplied to the main driving belt 58 through a power belt 61, Figs. 2 and 10, connected between the drive pulley of a motor 62 and an auxiliary drive pulley 63 associated with one of the spindle pulleys 51. The motor may be conveniently disposed and mounted on the under side of the bench 64 on which the winding machine 10 is supported, and the power belt may be taken up through an opening 65 in the table.

The need for controlling the direction of rotation of the respective spindles may be seen upon referring to Fig. 9. For illustrative purposes, a four-pole stator core 70 is shown developed, the pole faces being identified by Roman numerals I to IV, respectively. The pole shown dotted is the first pole shown again to clarify the winding path-sequence and disposition. The circles at the top and bottom of the pole faces represent the spindles 13 and 14 of Fig. 1.

Each two adjacent spindles rotate in opposite directions, so they jointly move their respective wire strands or loops in the same direction and at the same speeds, into or out of the intervening slot. Since the strands move at the same speeds through the slot, there is no relative longitudinal frictional movement between adjacent strands that would tend to rub the surfaces of the strands and injure the protective insulating covering on each wire of the strand. This is a feature of importance in the winding operation of the machine.

In order to protect the insulation on the wire during its movement along the winding path, the spindle tips are so positioned, as shown in Fig. 6, as to direct the winding coil sides substantially in a medial radial plane through the slot and the main axis of the core. In that manner the wires are kept from touching the edges of the side walls of the slots and engage only other wires that are moving in the same direction and at the same velocity, so that no relative motion exists anywhere that would cause a rubbing action against the fine wire that is used for winding the coils and the distributed windings. The spindle tips are formed to have very smooth surfaces, but are preferably made of a material with some surface friction, to prevent too easy slippage between the spindle tips and the wire strands.

Fig. 9 shows, by way of example, one arrangement of a winding path through four slots. When the winding is thus distributed, or wound as a distributed winding, the coil sides are not joined with the loops at both ends into individual coils of one or more turns, but the magnetizing effect on the core structure is established just the same as though the coil sides and their end loops were continuously connected into one coil.

In the arrangement in Fig. 9, where the distributed winding is to have several coil sides in each slot, the winding operation may be continued through the same closed winding path for as many times as may be necessary to draw the desired number of coil sides into the slots. The number of coil sides will be the same in each of the slots within which the distributed winding is disposed.

Where different numbers of coil sides are desired, however, in different slots, the winding arrangement and winding path will depart from the simple path that is shown in Fig. 9 and will be of a form where the winding path will include several turns in one particular coil section to provide several coil sides in two particular slots in order to increase the magnetization effect at one particular region of the stator core. For that arrangement, the winding path is arranged to embody several loops around the pair of top and bottom spindles before passing on to the next slot in the winding path sequence.

In Fig. 7 is shown a general disposition of a top spindle 13, with the spindle tip 13–a overhanging a tooth so the wire strands will clear the tooth and traverse the two slots on both sides of the slot. The bottom spindle 14 and its tip will be in appropriate position below the next adjacent tooth to provide the winding path outlined in Fig. 9.

In Fig. 8 is shown a modified disposition of spindle tips where a winding or core is to be placed to span an empty slot. Where such a winding is to be distributed, as one of several phase windings, each phase winding may be completely wound on the core, and then suitable winding arrangements made by properly disposing the spindles for the positioning of the next phase winding to be located, or by angularly shifting the partly-wound core structure in the winding machine.

In order to permit use of the machine for maximum operating time intervals, it is desirable to simplify the setting-up operation prior to the commencement of a winding operation, after a core structure has been inserted into the machine to be wound.

For that purpose, a leader, consisting of a flexible strand of thread or nylon, or the wire itself, if formed into a loop pattern corresponding to the actual winding path pattern, such as in Fig. 9, for example, through which a wire conductor must be pulled and wound to form the final desired coil or distributed winding, to provide the desired magnetic effect.

In order to provide a simple and accurate arrangement and method for counting the number of turns as the winding operation proceeds, the cement for attaching the wire to the leader may be treated with an isotope, and a Geiger counter used to count the number of turns made. This method provides an accurate check against slippage of the wire on the spindles, whose rotations might not provide the accuracy desired.

Obviously, various modifications could be made in the constructional details of the machine, without departing from the spirit and scope of the invention.

Obviously, the disposition and arrangement of the spindles may be modified and varied to provide suitable operation for various types of windings.

What is claimed is:

1. A winding machine for winding magnetizing coils directly on annular magnetizable stator core structures provided with coil receiving slots, said machine comprising an annular ring having an axis and serving to co-axially support a core structure to be wound, a plurality of sets of spindles respectively disposed in radial planes relative to the annular supporting ring with each set of spindles being disposed to straddle the supporting ring and the stator core in a radial plane through a stator slot to be wound when the stator core is in place, means for advancing the several sets of spindles centripetally to locate the front tips of the spindles at their respective operating winding positions adjacent the respective ends of the associated stator slots to be wound and for retracting the spindles after a winding operation to permit the stator core to be removed, and means for rotating the spindles.

2. A winding machine for winding coils in place on a magnetizable core structure provided with slots for accommodating the coils, said machine comprising a pair of spindles provided with shaped tips for supporting and guiding wire strands for reeving movement through an associated core slot, and means for rotating the spindles to achieve non-frictional movement of a wire strand on the spindle tips to accumulate a coil on said tips and for axially shifting the spindles to enable the accumulated coils to be easily removed from the tips.

3. A winding machine for winding coils in place on a radially slotted stator core structure having an axis, said machine comprising means for supporting an inserted stator core concentrically relative to a predetermined fixed axis on the machine; a pair of rotatable spindles for each slot of the stator that is to receive a coil side; and means for supporting each pair of the spindles in a radial-parallel plane through the axis and one slot, to enable the spindles to be moved to and retracted from their operative positions adjacent the respective ends of the associated slots, means for rotating the spindles and means for maintaining a driving connection between the rotating means and the spindles in all positions of the spindles.

4. A winding machine for winding coils in place on a radially slotted stator core structure, said machine comprising means for positioning and supporting an inserted stator core in a predetermined axial position, a pair of spindles for guiding a wire for each slot of the core that is to receive a coil side, and means for supporting and actuating the spindles for rotary and for translatory motion, to enable the spindles to be advanced to operative positions adjacent the slot ends and to be rotated there for winding operation, and to enable the spindles to be retracted from such operative positions to clear the path for inserting a core to be wound and for permitting the core to be removed from the machine, and means for supplying the wire to the spindles for disposition in the slots.

5. A winding machine for winding coils in place on a radially slotted stator core structure, said machine comprising means for positioning and supporting an inserted core in a predetermined axial position, a pair of spindles for guiding wire into each of certain predetermined slots of the core, means for supporting the spindles for rotary and for translatory motion relative to said slots, and means for rotating the spindles in selected directions of rotation, to dispose wire from an external supply into position in selected slots.

6. A winding machine for winding coils directly in place on a slotted stator for a dynamo-electric machine, said winding machine comprising means for releasably holding an inserted stator core concentrically stationary around a fixed axis of the machine, a spindle for one end of each slot and a spindle for the other end of each slot that is to receive a coil side, means for supporting each spindle in a radial-parallel plane that extends through its associated slot and said fixed axis of the machine, and means for shifting each spindle along its own axis to advance the spindle to operative position at the associated end of its respective slot or to retract the spindle away from the rotor core position to permit axial movement of a core through an unobstructed path into position for winding the core or out of position for removal of the core.

7. A winding machine for forming a coil or a distributed winding on a slotted stator core, said machine comprising means defining a core zone for receiving and holding an inserted stator core concentrically on a predetermined axis of the machine; a pair of spindles for each slot of the core; means for supporting said spindles in a radial plane through said axis and said respective slot, said supporting means serving also to support the spindles for rotary and translatory motion; and means for positioning said supporting means to locate one end of one spindle of each pair at a position adjacent one end of the associated slot when the spindle is in operative position and to retract the spindle end from the core zone when a core is to be inserted or removed.

8. A winding machine for winding a coil directly in place in the slots of a dynamo-electric core structure, the machine comprising an annular ring disposed concentrically around a vertical main axis for concentrically supporting an inserted core structure that is to be wound, with the core slots being thus held in stationary vertical concentric position; a pair of rotatable spindles supported parallel to a radial plane through the axis of a slot; means for moving the spindles to straddle an inserted core structure so the inner or front ends of the spindles respectively extend over one end and under the other end of said slot, and said moving means being effective for retracting the spindles from adjacent the slot ends and away from the position to be occupied by an inserted core structure, to permit a core structure to be positioned in and removed from the annular positioning ring, and a pulley on the outer end of each spindle to receive rotative energy for the spindles to drive a wire strand supported on the spindle ends.

9. A bench winding machine for winding coils and distributed windings directly into slots on an inserted small slotted stator core for dynamo-electric machines, comprising a central annular ring concentric about a vertical central axis of the machine, to serve as a support for positioning an inserted stator core co-axially with said axis; a pair of spindles movable to operating position to straddle a slot of said core for guiding into the slot a wire to be wound in said slot; bearing means supporting each spindle for rotation; a shell supporting each said bearing means; a guide ring on said central annular ring serving to support and guide each bearing shell for translatory axial movement along its spindle axis; and means for selectively moving the bearing shell together with the spindle and the spindle bearing means either to advanced position to permit winding operation, or to retracted position to clear the core-receiving space in the central annular ring to permit insertion or removal of a core, said moving means including a cam ring concentric with the central annular ring; means for angularly operating the cam ring; and means controlled by the cam ring for converting the angular movement of the cam ring to translatory movement of the bearing shell for the spindle, to control the advancing and retracting motion of the spindle.

10. A bench winding machine, as in claim 9, in which a pair of spindles is provided for each slot of the core to be wound; with bearing means and a bearing shell for each spindle; and the means controlled by the cam ring serving to simultaneously selectively operate all the spindles to advanced or to retracted positions.

11. A winding machine for winding magnetizing coils directly into slots on dynamo-electric structures provided with coil slots and inserted into the machine, the machine comprising a support for receiving and supporting a structure having slots to be wound, a plurality of spindle sets, each set consisting of a pair of complementary spindles to be respectively disposed at the opposite ends of a slot in the structure that is to contain a coil side; antifriction bearing supports for the respective spindles, means for supporting the spindles with their axes on lines of a conical surface of revolution to straddle the slot, with one end of each spindle adjacent one end of the slot; and means at the other end of each spindle for imparting rotative force to each spindle.

12. A coil winding machine for winding a coil directly onto a separate slotted core stator, that is to be temporarily inserted into the winding machine to receive the coils, the stator having slots disposed on a circle concentric about an axis, to be supplied with windings to enable the stator to function as an element of a dynamo-electric apparatus, said machine comprising a supporting ring having an axis and serving to support such a stator co-axially temporarily during the winding operation, a pair of rotatable spindles having front end tips and being movable to move those tips to and from operating position adjacent the respective ends of each slot of the stator that is to be filled with a coil side, means for moving the spindles to move those tips to and from said operating positions, and means for rotating the spindles while they are in said operating positions, to impart coiling movement to the coil as it is being wound in place in the stator slots.

13. A winding machine as in claim 12, in which the supporting ring lies in a horizontal plane with its axis vertical, to receive a slotted annular stator core in co-axial position, and the spindles are disposed for radial movement, relative to said axis, to and from said operating positions adjacent the stator core slots and to straddle the core-receiving space, to permit free insertion of the stator core into, and its removal from, said space in the supporting ring.

14. A bench machine for receiving small stator cores and for winding coils and distributed windings directly into slots in such small slotted stators for subsequent use in dynamo-electric apparatus, said winding machine comprising a central annular ring concentric about a vertical central axis of the machine, to serve as a support for positioning an inserted stator core concentrically with said axis, and said annular ring having a central core-receiving space to accommodate the core; a pair of spindles supported for axial translation to operating position to straddle a slot of the core for guiding a wire to be wound in the slot or to be retracted to nonoperating position; bearing means for supporting each spindle for rotation; a quill for co-axially supporting each said bearing means for the spindles; a guide ring on said central annular ring for supporting and guiding each bearing quill for axial translatory movement along its spindle axis; and means for selectively moving the bearing quill together with the spindle and the spindle bearing means either to advanced position to straddle the core for winding operation, or to retracted position to clear the core-receiving space in the central annular ring, to permit insertion or removal of a core.

15. A winding machine for winding magnetizing coils directly into slots on dynamo-electric structures provided with coil slots, and inserted into the machine, the machine comprising a support to receive such an inserted structure having such slots to be wound, a plurality of spindle sets, each set consisting of a pair of complementary spindles and each spindle to be respectively disposed at the opposite ends of a slot that is to receive and contain a coil side, anti-friction bearing supports for the respective spindles, means for supporting the spindles with their axes on lines of a conical surface of revolution with one end of each spindle adjacent one end of said slot, and means on the other end of each spindle for imparting rotative force to each such spindle, the spindle axes lying on a virtual conic surface and being inclined to the main axis of the virtual cone, and the tips of the spindles adjacent the slot ends being tapered towards their ends to compensate for the slant of the spindle axes and to provide substantially level winding surfaces for guiding and accumulating coil turns at the ends of the associated slot.

References Cited in the file of this patent

UNITED STATES PATENTS

| 656,264 | Revel | Aug. 21, 1900 |
| 751,816 | Strong | Feb. 9, 1904 |
| 1,431,947 | Gysel | Oct. 17, 1922 |
| 2,389,336 | Wirth | Nov. 20, 1945 |

FOREIGN PATENTS

| 503,525 | Germany | Feb. 24, 1929 |